(12) United States Patent
Chou et al.

(10) Patent No.: US 8,457,095 B2
(45) Date of Patent: Jun. 4, 2013

(54) METHOD FOR BANDWIDTH RECOVERY OF COMMUNICATION SYSTEM

(75) Inventors: Zi-Tsan Chou, Taipei (TW); Yu-Hsiang Lin, Taoyuan County (TW); Lee-Jen Lu, Taipei (TW)

(73) Assignee: Institute For Information Industry, Taipei City (TW)

( * ) Notice: Subject to any disclaimer, the term of this patent is extended or adjusted under 35 U.S.C. 154(b) by 1200 days.

(21) Appl. No.: 11/962,106

(22) Filed: Dec. 21, 2007

(65) Prior Publication Data
US 2009/0141696 A1 Jun. 4, 2009

(30) Foreign Application Priority Data
Dec. 3, 2007 (TW) .............................. 96145936 A (51) Int. Cl.
| | |
|---|---|
| H04B 7/212 | (2006.01) |
| H04B 7/216 | (2006.01) |
| H04B 1/00 | (2006.01) |
| H04W 4/00 | (2009.01) |
| H04W 40/00 | (2009.01) |
| H04L 12/28 | (2006.01) |

(52) U.S. Cl.
USPC ........... 370/347; 370/328; 370/390; 370/320; 455/446; 375/145

(58) Field of Classification Search
USPC .................... 370/347, 395.42, 390, 392, 320, 370/252; 455/446, 452.1; 375/145
See application file for complete search history.

(56) References Cited

U.S. PATENT DOCUMENTS

| | | | | |
|---|---|---|---|---|
| 5,751,708 | A * | 5/1998 | Eng et al. ................. | 370/395.42 |
| 2005/0157674 | A1* | 7/2005 | Wentink ........................ | 370/328 |
| 2005/0286408 | A1 | 12/2005 | Jin | |
| 2006/0171390 | A1* | 8/2006 | La Joie ........................ | 370/390 |
| 2007/0086374 | A1* | 4/2007 | Jang et al. ..................... | 370/328 |
| 2007/0159982 | A1* | 7/2007 | Singh et al. ................... | 370/252 |
| 2008/0089394 | A1* | 4/2008 | Poberezhskiy et al. ....... | 375/145 |
| 2008/0151812 | A1* | 6/2008 | Camp et al. ................... | 370/320 |
| 2008/0153504 | A1* | 6/2008 | Bourlas et al. ............. | 455/452.1 |
| 2008/0285564 | A1* | 11/2008 | Park et al. ..................... | 370/392 |
| 2008/0311918 | A1* | 12/2008 | Spencer ........................ | 455/446 |

FOREIGN PATENT DOCUMENTS

| | | |
|---|---|---|
| KR | 1020060133070 A | 12/2006 |
| KR | 1020070012704 | 1/2007 |
| KR | 1020080039778 A | 5/2008 |
| WO | 2007089797 A2 | 8/2007 |

* cited by examiner

Primary Examiner — Ian N Moore
Assistant Examiner — Kiet Tang
(74) Attorney, Agent, or Firm — Winston Hsu; Scott Margo (57) ABSTRACT

A bandwidth recovery method for a communication system includes: transmitting a first uplink scheduling message to at least a first communication node and a second communication node of a plurality of communication nodes in the communication system; detecting if a communication channel is in an idle state after a first transmission start time; then, transmitting a second uplink scheduling message to the plurality of the communication nodes when the communication channel is found to be in the idle state after the first transmission start time.

8 Claims, 6 Drawing Sheets

METHOD FOR BANDWIDTH RECOVERY OF COMMUNICATION SYSTEM

BACKGROUND OF THE INVENTION

1. Field of the Invention

The present invention relates to a communication system, and more particularly, to a method of processing bandwidth recovery of a communication system.

2. Description of the Prior Art

With wireless technology becoming more and more popular, related standards such as IEEE 802.16 have been established. A major objective of IEEE 802.16 Broadband Wireless Access Standard is to solve problems associated with "last mile"; IEEE 802.16 Broadband Wireless Access Standard supplies a wireless transmission technology for replacing conventional wired transmission technology of long distance that utilizes cables or digital subscriber loops (DSL).

Different from the wireless accessing technology established by the IEEE 802.11 standard, IEEE 802.16 applies a scheduling algorithm upon the media access control (MAC) for distributing wireless resources to a plurality of Subscriber Stations (SS). According to the IEEE 802.16 standard, a transmission time is divided into a plurality of frames each having a fixed size. In addition, each frame is further divided into a downlink subframe (DL subframe) and an uplink subframe (UL subframe). Please note, however, that the size of the DL subframe is not restricted to be the same as that of the UL subframe.

In the DL subframe, the communication traffic between a base station (BS) and subscriber stations downloads data from the base station to the subscriber stations; in the UL subframe, the communication traffic between the base station and subscriber stations uploads data from the subscriber stations to the base station.

At the beginning of the DL subframe, there is a short message acting as an uplink scheduling message, also named as UL-MAP in accordance with the IEEE 802.16 standard. The uplink scheduling message is generated from the base station, and includes message transmission scheduling of the subscriber stations. That is to say, the base station uses the uplink scheduling message to schedule the timing when the subscriber stations are allowed to transmit data to the base station, to schedule the data amount to be transmitted when the subscriber stations are granted to transmit data to the base station, and then the base station broadcasts the uplink scheduling message to the belonging subscriber stations.

In some specific conditions (detailed below), the uplink channel will become idle, resulting in the waste of bandwidth.

1. Idling UL-Burst Period Problem

When a noise interference source approaches the BS, the information carried within the uplink scheduling message will be damaged. All the subscriber stations of the BS consequently fail to receive the uplink scheduling message correctly and therefore the subscriber stations lack the information for uploading data to the BS. In other words, the subscriber stations have no idea of when to upload data. As a result, the whole UL-burst period is idle due to no subscriber station being capable of uploading data, causing an excessive waste of the bandwidth.

2. Uplink Hole Problem

The uplink hole problem happens when a noise interference source approaches some of the subscriber stations, making the affected subscriber stations fail to receive the information carried within the uplink scheduling message correctly. If the uplink scheduling message contains information for informing the subscriber stations of the timing when to upload data, the intervals originally scheduled within the UL-burst period for the subscriber stations interfered by the noise interference source will become idle, resulting in waste of the bandwidth.

3. Padding Waste Problem

In accordance with the IEEE 802.16 standard, if the base station schedules an uplink time longer than the subscriber station actually requires for uploading data, the subscriber station will transmit padding data (such as padding bits or padding MPDU) to the base station for filling the remaining uplink time. Sometimes, the size of the padding data is up to 2041 bytes, causing serious waste of uplink channel bandwidth.

The IEEE 802.16 standard does not currently deal with the aforementioned three problems. Therefore, a bandwidth recovery method for solving the aforementioned bandwidth waste problems is desired.

SUMMARY OF THE INVENTION

It is therefore one of the objectives of the present invention to provide a bandwidth recovery method for a communication system to solve the aforementioned problems.

According to one aspect of the present invention, a bandwidth recovery method for a communication system is disclosed. The bandwidth recovery method includes transmitting a first uplink scheduling message to at least a first communication node and a second communication node within a plurality of communication nodes of the communication system, wherein the first communication node and the second communication node share a communication channel, wherein the first uplink scheduling message is utilized for distributing communication time segments to the first communication node and the second communication node within the communication channel. The method then detects if the communication channel is in an idle state after the first transmission start time, wherein the first transmission start time is the time when the first communication node is allowed to start transmitting data; and transmits a second scheduling message to the plurality of the communication nodes when the communication channel is found in the idle state after the first transmission start time, wherein the second uplink scheduling message is utilized for distributing communication time segments to at least one communication node of the first communication node and the second communication node within the communication channel.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
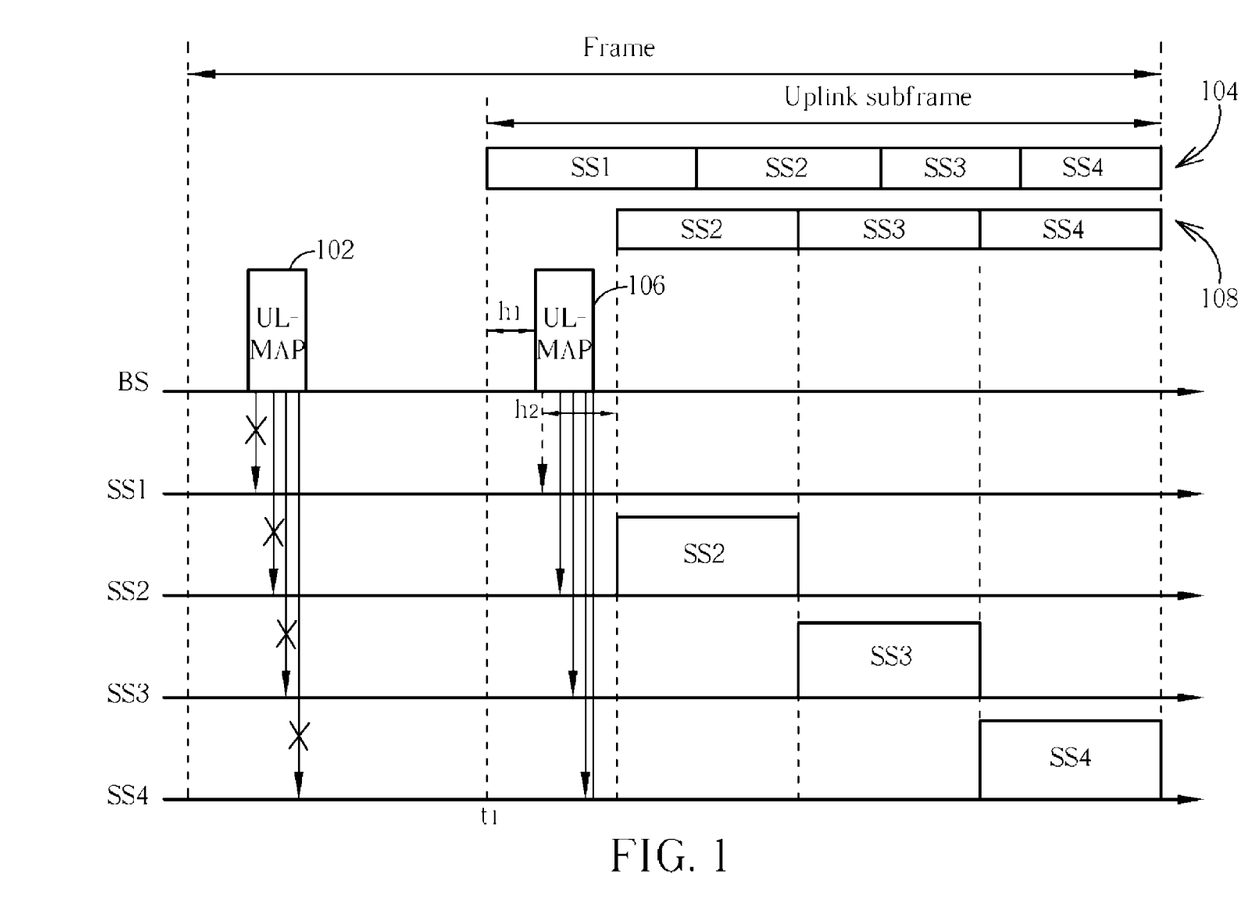
FIG. 1 is a timing diagram illustrating a bandwidth recovery method of the present invention employed when a base station suffers from noise interference.

Please refer to FIG. 1. FIG. 1 is a timing diagram of a bandwidth recovery method of the present invention employed when a base station suffers from noise interference. As shown in FIG. 1, at the beginning of a downlink subframe, the base station BS transmits an uplink scheduling message 102 to the belonging subscriber stations (i.e., communication nodes SS1-SS4). For simplicity, in the following description, the uplink scheduling message 102 is implemented using an UL-MAP for illustrative purposes and the number of subscriber stations is four; however, it should be noted that the number of subscriber stations corresponding to the base station BS is not meant to be a limitation of the present invention and the uplink scheduling message is not restricted to be UL-MAP complying with the IEEE 802.16 standard. In other words, the uplink scheduling scheme disclosed in the present invention is not limited to be applied to communication systems complying with the IEEE 802.16 standard. For example, the communication system could be a system complying with a Data Over Cable System Interface Specification (DOCSIS).

The uplink scheduling message 102 contains a schedule for allocating uplink time of each of the subscriber stations SS1-SS4 to upload data to the base station BS. The content within the UL-MAP mainly includes an identifier of each subscriber station $SS_i$, a start time $t_i$ of each subscriber station, and a transmission duration $x_i$ (the suffix i is from 1 through 4 since there are four exemplary subscriber stations in this embodiment) of each subscriber station. The start time $t_i$ represents timing when a subscriber station $SS_i$ is allowed to start transmitting data. The relation between $t_i$ and $x_i$ is shown below:

$$x_{i+1}=x_i+t_i$$

An uplink scheduling content 104 is the distribution condition of an uplink burst period of the subscriber stations SS1-SS4 belonging to the base station BS. In a normal case where all of the subscriber stations SS1-SS4 receive the correct uplink scheduling message (UL-MAP) 102, each of the subscriber stations follows the schedule configured in the uplink scheduling content 104 to upload data to the base station BS according to the allocated uplink time period.

When there is a noise interference source approaching the base station BS, the uplink scheduling message (UL-MAP) 102 cannot be received by the subscriber stations SS1-SS4 correctly. None of the subscriber stations will upload data in the duration of the uplink subframe. To solve the aforementioned bandwidth waste problem, the base station BS in the present embodiment will detect whether an uplink channel is at an idle state or not in the uplink subframe duration, where the uplink channel is shared by the four subscriber stations SS1-SS4. When the subscriber station $SS_i$ which is scheduled to upload data does not execute the upload operation for a period exceeding a predetermined time $h_1$ after the start time (i.e., $t_1$ in this embodiment), the base station BS will transmit an uplink scheduling message 106 toward the belonging subscriber stations SS1-SS4 after time $t_1+h_1$, wherein the predetermined time $h_1$ is not shorter than a propagation time since a subscriber station receives a wireless carrier only when the wireless carrier has traveled via air for the propagation time.

The present invention provides two bandwidth recovery methods R1 and R2, to solve the aforementioned bandwidth waste problems. Before transmitting the uplink scheduling message (UL-MAP) 102, the base station BS will analyze whether each duration $x_i$ respectively corresponding to the subscriber station $SS_i$ exceeds a threshold value or not; if all the durations $x_i$ exceed the threshold value, the base station BS is allowed to adopt either the recovery method R1 or the recovery method R2 arbitrarily; otherwise, the base station BS is permitted to adopt the recovery method R1 only. The related description directed to the evaluation equation and the threshold value will be disclosed as follows.

Regarding the recovery method R1, the base station BS re-arranges the remaining uplink duration. As shown in FIG. 1, the content within the uplink scheduling message (UP-MAP) 106 includes new start time $t_i^*$ and new duration $x_i^*$ allocated to the subscriber stations. The uplink scheduling content 108 is the new schedule of uplink transmission. The new start time $t_2^*$ of the subscriber station SS2 is equal to $t_1+h_1+h_2$, i.e., $t_2^*=(t_1+h_1+h_2)$. The duration $h_2$ represents a time difference between the timing when the uplink scheduling message (UL-MAP) 106 is broadcasted and the new start time $t_2^*$ of the subscriber station SS2, and the duration $h_2$ meets the following inequality:

$$h_2 \geq T_{proc}+T_{UM}+STTG+u;$$

where $T_{proc}$ represents processing time needed by Media Access Control (MAC); $T_{UM}$ represents time needed for transmitting the uplink scheduling message (UL-MAP) 106; STTG represents operating time needed by the subscriber station SS2 to transfer from a receiving mode to a transmitting mode; and u represents signal propagation time.

The new start time scheduled by the uplink scheduling message (UL-MAP) 106 is equal to a transmission time of the uplink scheduling message (UL-MAP) 106 plus a specified duration (i.e., $h_2$), wherein the new start time represents the timing when the subscriber station SS2 is allowed to start transmitting data, and the specified duration (i.e., $h_2$) is not shorter than an operating time starting from the transmission time of the uplink scheduling message (UL-MAP) 106 to the time when the subscriber station SS2 can start transmitting data, i.e., $T_{proc}+T_{UM}+STTG+u$.

Figure 2:
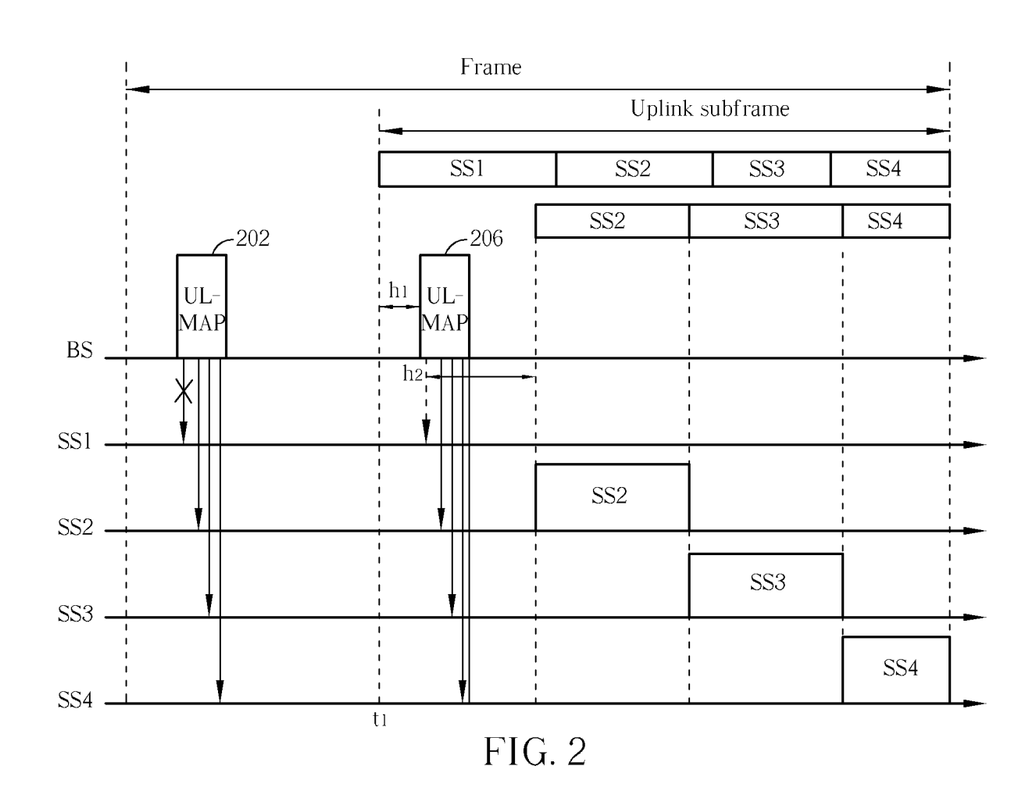
FIG. 2 is a timing diagram illustrating a bandwidth recovery method of a first exemplary embodiment employed when a subscriber station suffers from noise interference.

Please refer to FIG. 2. FIG. 2 is a timing diagram of the recovery method of a first exemplary embodiment employed when subscriber station(s) suffer from noise interferences. Similar to the operation shown in FIG. 1, when the base station BS detects that the uplink channel is idle for a period exceeding a predetermined time $h_1$ in the duration of the uplink subframe, the base station BS re-arranges the uplink time and transmits the uplink scheduling message (UL-MAP) 206 to the subscriber stations (SS1-SS4 in the present embodiment) at time $t_1+h_1$. Since the operations associated with the following procedure have been detailed above, further description is omitted here for brevity.

Figure 3:
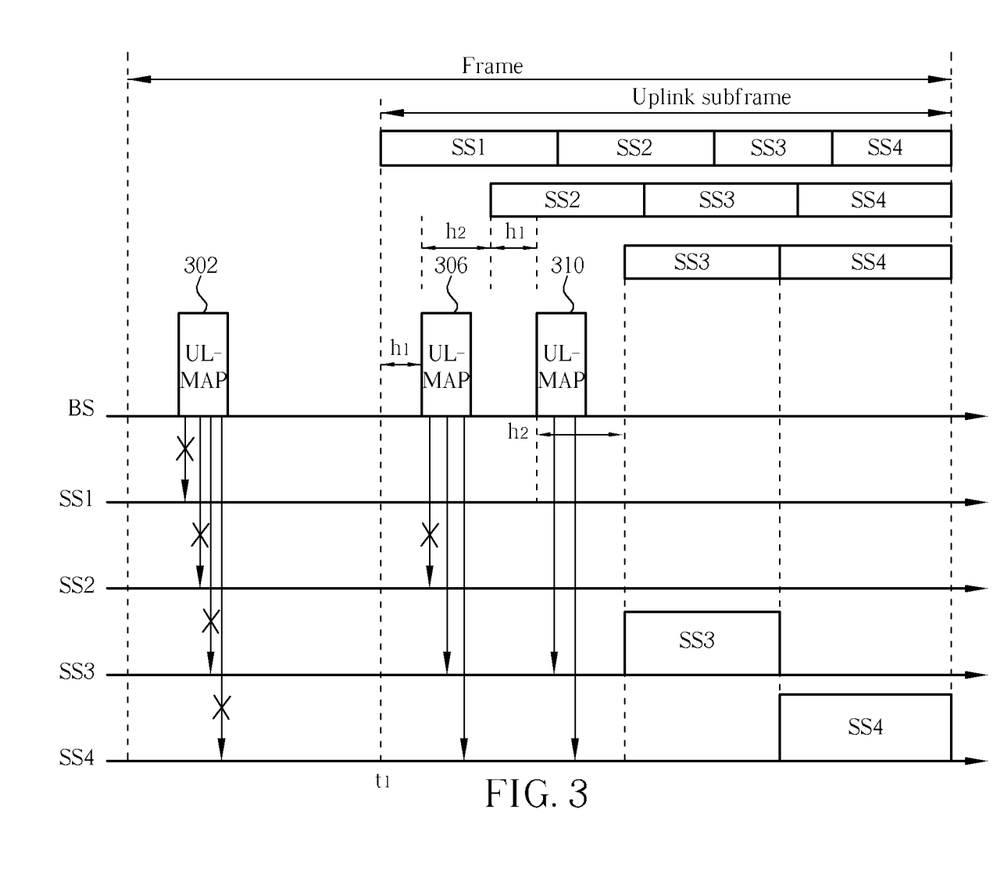
FIG. 3 is a timing diagram illustrating a bandwidth recovery method according to a first exemplary embodiment employed when subscriber stations of a base station suffer from noise interference and fail to receive a new uplink scheduling message correctly.

Please refer to FIG. 3. FIG. 3 is a timing diagram illustrating the recovery method according to an exemplary embodiment employed when the subscriber stations fail to correctly receive the new uplink scheduling message broadcast from the base station due to noise interference. As shown in FIG. 3, most operations are similar to those illustrated in FIG. 1 and FIG. 2. The major difference is that the subscriber station SS2 suffers from noise interference when the base station transmits the new uplink scheduling message (UL-MAP) 306. As a result, the subscriber station SS2 fails to receive the new uplink scheduling message (UL-MAP) 306 correctly. The subscriber station SS2 therefore does not execute an upload operation owing to the noise interference. Similar to the related operations illustrated in FIG. 1 and FIG. 2, when the base station BS detects that an uplink channel is idle for a period exceeding a predetermined value $h_1$ after transmitting the uplink scheduling message UL-MAP 306, the base station BS re-arranges the remaining uplink period and transmits a new uplink scheduling message (UL-MAP) 310 to the subscriber stations at time $t_1+h_1+h_2+h_1$. The subscriber stations SS3 and SS4 will upload data according to the uplink schedule delivered by the uplink scheduling message (UL-MAP) 310.

From the aforementioned embodiments, a feature of the recovery method R1 is that the base station BS re-arranges and re-schedules the uplink time of the subscriber stations when re-transmitting the uplink scheduling message (UL-MAP); in addition, the subscriber stations should remain at a listening state in the duration of the uplink subframe as the subscriber stations have no opportunity to transmit data, and do not transit from the listening state to a transmitting state until the above-mentioned STTG time before being allowed to upload data. In a case where a subscriber station fails to receive the uplink scheduling message (UL-MAP) while waiting to upload data, the subscriber station determines the condition is a collision state and hence has to temporarily stop its uplink schedule until the uplink scheduling message (UL-MAP) is correctly received. The subscriber station then uploads data to the base station according to the uplink schedule defined in the new uplink scheduling message (UL-MAP).

The second bandwidth recovery method R2 of the present invention is not allowed to be employed until a condition as follows is satisfied:

$x_i \geq h_1+h_2+D+T_{BR}$ is true for $1 \leq i \leq 4$, where D represents a preamble time plus STTG, and $T_{BR}$ represents time needed for transmitting a bandwidth request.

At the beginning of the downlink subframe the base station BS first detects whether all the belonging subscriber stations (if the total number of subscriber stations is N, then the suffix i is from 1 through N) meet the following condition: $x_i-(h_1+h_2) \geq D+T_{BR}$. In another word, the base station BS checks if the remaining time for transmitting data, which is equal to a result of subtracting the time required for transmitting and processing the uplink scheduling message (UL-MAP) from the allocated uplink duration $x_i$, is longer than the time needed for transmitting a minimum data unit, i.e., $D+T_{BR}$, wherein the minimum data unit represents a sum of preamble bits and a bandwidth request. This is since the bandwidth recovery method R2 does not re-arrange the duration $x_i$, except for certain subscriber station (s) failing to receive the uplink scheduling message during the downlink subframe. The above condition, $x_i \geq h_1+h_2+D+T_{BR}$, is a premise condition for adopting the bandwidth recovery method R2.

Figure 4:
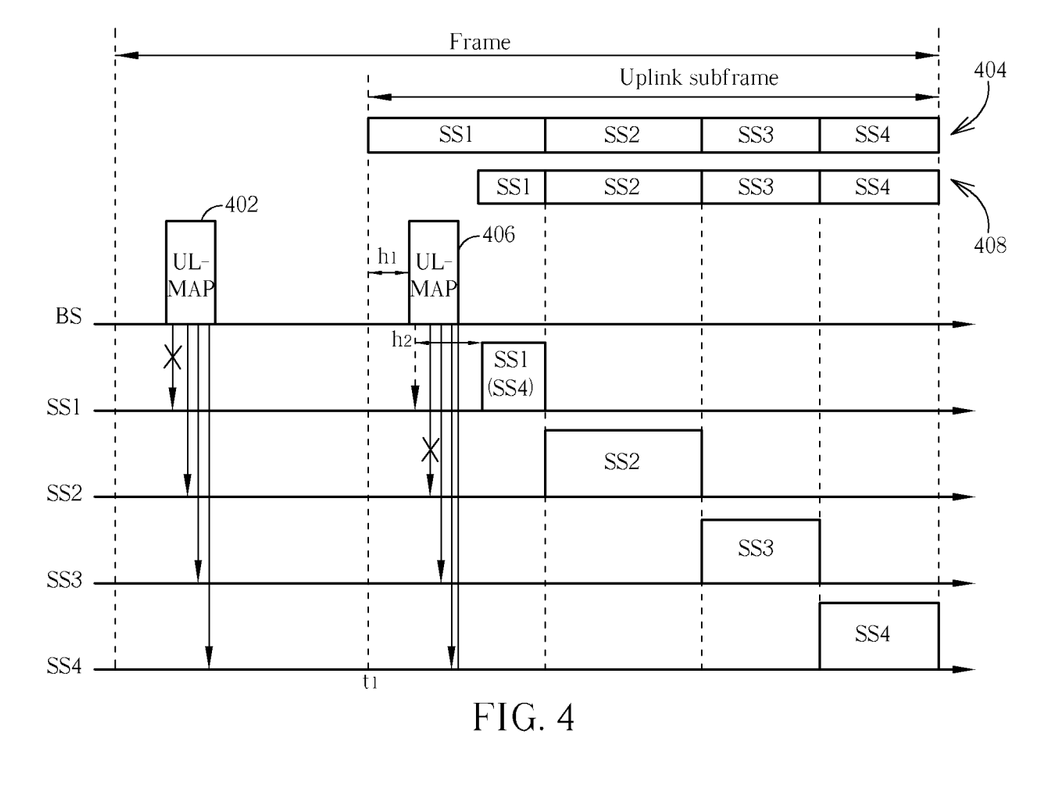
FIG. 4 is a timing diagram illustrating a bandwidth recovery method according to a second exemplary embodiment employed when subscriber station(s) suffer from noise interference.

Please refer to FIG. 4. FIG. 4 is a timing diagram illustrating a bandwidth recovery method according to a second exemplary embodiment employed when subscriber station(s) suffer from noise interference. As shown in FIG. 4, at the beginning of the downlink subframe the base station BS adopts the second bandwidth recovery method R2 ($x_i \geq h_1+h_2+D+T_{BR}$ for $1 \leq i \leq 4$), and transmits the uplink scheduling message (UL-MAP) 402 to the belonging subscriber stations SS1-SS4. The subscriber stations SS1-SS4 will execute the upload operation according to the uplink scheduling content 404. As shown in FIG. 4, the subscriber station SS1 does not upload data to the base station BS after the start time $t_1$ as the subscriber station SS1 fails to receive the uplink scheduling message (UL-MAP) 402 correctly. When the base station BS detects that the uplink channel is idle for a period exceeding a predetermined time $h_1$ after the start time $t_1$ of the subscriber station SS1, the base station BS at this time will first check if the remaining uplink period is longer than $h_2+D+T_{BR}$ or not, and transmits a new uplink scheduling message (UL-MAP) 406 to the belonging subscriber stations SS1-SS4 when the remaining time is longer than $h2+D+T_{BR}$. In the present embodiment as illustrated in FIG. 4, the uplink scheduling content 408 carried via the uplink scheduling message (UL-MAP) 406 and the uplink scheduling content 404 carried via the uplink scheduling message (UL-MAP) 402 are roughly the same (for example, the start time $t_2$-$t_4$ and the duration $x_2$-$x_4$ for the subscriber station SS2-SS4 remaining the same), except that the schedule of the subscriber station SS1 has been changed. As for the subscriber station SS1, the allocated uplink duration is only $x_1-(h_1+h_2)$, which is shorter than the originally allocated uplink duration $x_1$ set by the uplink scheduling message (UL-MAP) 402.

Please note that, in the present embodiment, the uplink scheduling message (UL-MAP) 406 also can set an additional duration to the other following subscriber stations, for example, the subscriber station SS4, by utilizing the remaining uplink duration originally allocated to the subscriber station SS1. As a result, the subscriber station SS4 has two uplink durations allocated for uploading data to the base station BS. This alternative design also falls in the scope of the present invention.

The key difference between the recovery methods R1 and R2 is that the base station BS does not re-arrange and re-schedule the uplink duration of the subscriber stations when the second bandwidth recovery method R2 is implemented; in addition, the subscriber stations SS1-SS4 are only required to receive the correct uplink scheduling message (UL-MAP) once before starting uploading data. As shown in FIG. 4, even though the subscriber station SS2 does not receive the uplink scheduling message (UL-MAP) 406, the subscriber station SS2 is able to transmit data to the base station BS at the designated start time $t_2$ because the previously broadcasted uplink scheduling message (UL-MAP) 402 has been successfully received by the subscriber station SS2 at the beginning of the downlink subframe.

Figure 5:
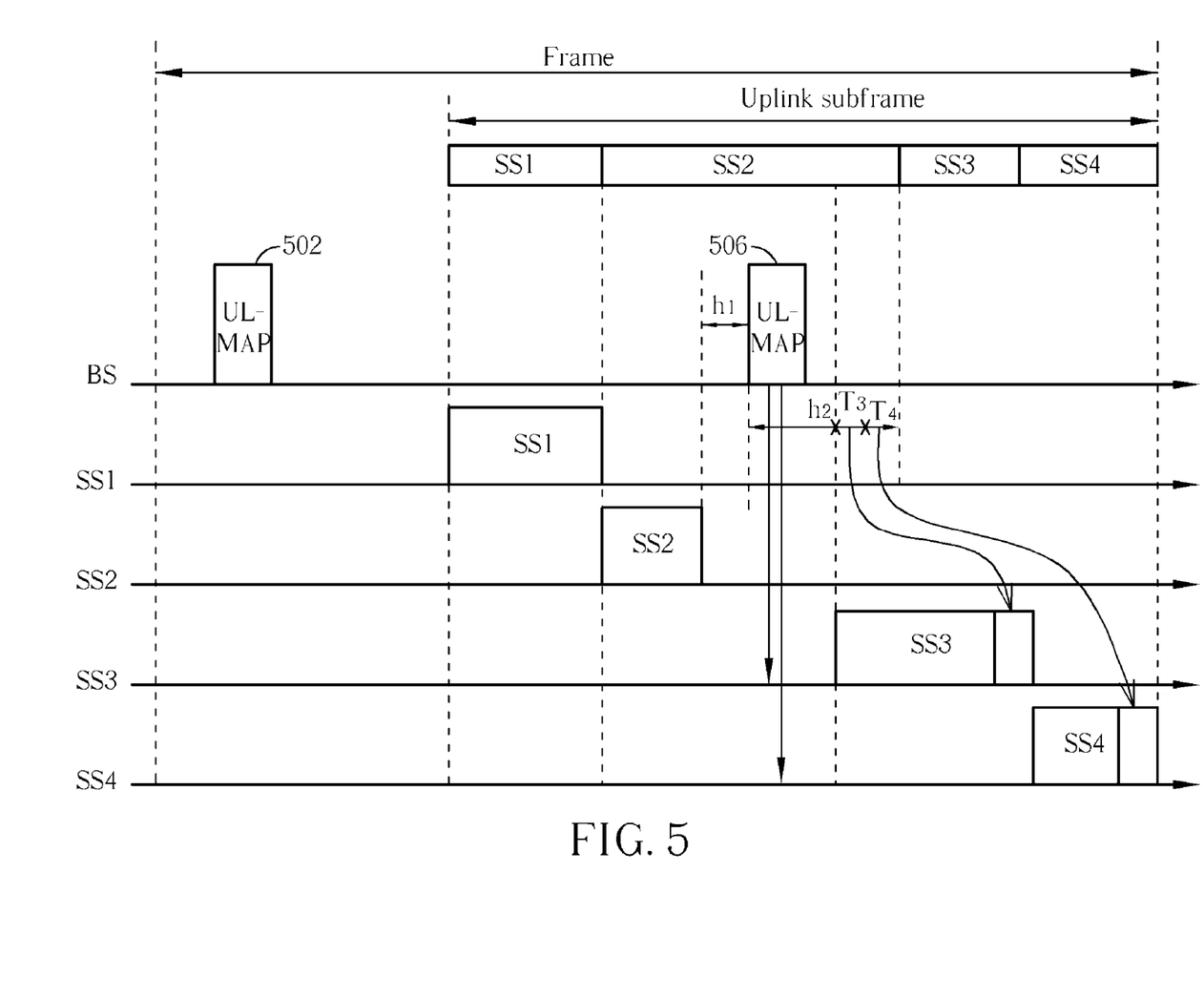
FIG. 5 is a timing diagram illustrating a bandwidth recovery method according to a first exemplary embodiment employed when an uplink channel is under a padding waste condition.

Please refer to FIG. 5. FIG. 5 is a timing diagram illustrating a bandwidth recovery method according to a first exemplary embodiment employed when the uplink channel is under a padding waste condition. As shown in FIG. 5, in the present embodiment, if an uplink duration $x_2$ of the subscriber station SS2 is longer than actually needed, after the subscriber station SS2 finishes the transmitting operation, the subscriber station SS2 will deliver no padding data. As a result, the uplink channel during the extra duration assigned to the subscriber station SS2 will become idle. As shown in FIG. 5, the base station BS first detects as mentioned above, and then transmits an uplink scheduling message (UL-MAP) 506. In the present embodiment, the base station BS adopts the bandwidth recovery method R1 to distribute the remainder of the duration originally assigned to the subscriber station SS2 to two subscriber stations SS3 and SS4 respectively. Suppose that the remainder of the duration is $T_3+T_4$, as shown in FIG. 5. Within the new uplink scheduling message UL-MAP 506, a new duration $x_3^*$ of the subscriber station SS3 is set by $x_3+T_3$ (i.e., $x_3^*=x_3+T_3$), and a new duration $x_4^*$ of the subscriber station SS4 is set by $x_4+T_4$ (i.e., $x_4^*=x_4+T_4$). Please note that in the present embodiment shown in FIG. 5, the remaining available duration is evenly distributed to the subscriber stations SS3 and SS4; however, this is for illustrative purposes only and is not meant to be a limitation of the present invention. In other embodiments of the present invention, the remaining uplink duration that is not used by the subscriber station SS2 for data transmission can be adequately distributed to the following subscriber stations depending on design requirements, and is not restricted to be evenly distributed to the following subscriber stations. These alternative designs still obey the spirit of the present invention and fall in the scope of the present invention.

Figure 6:
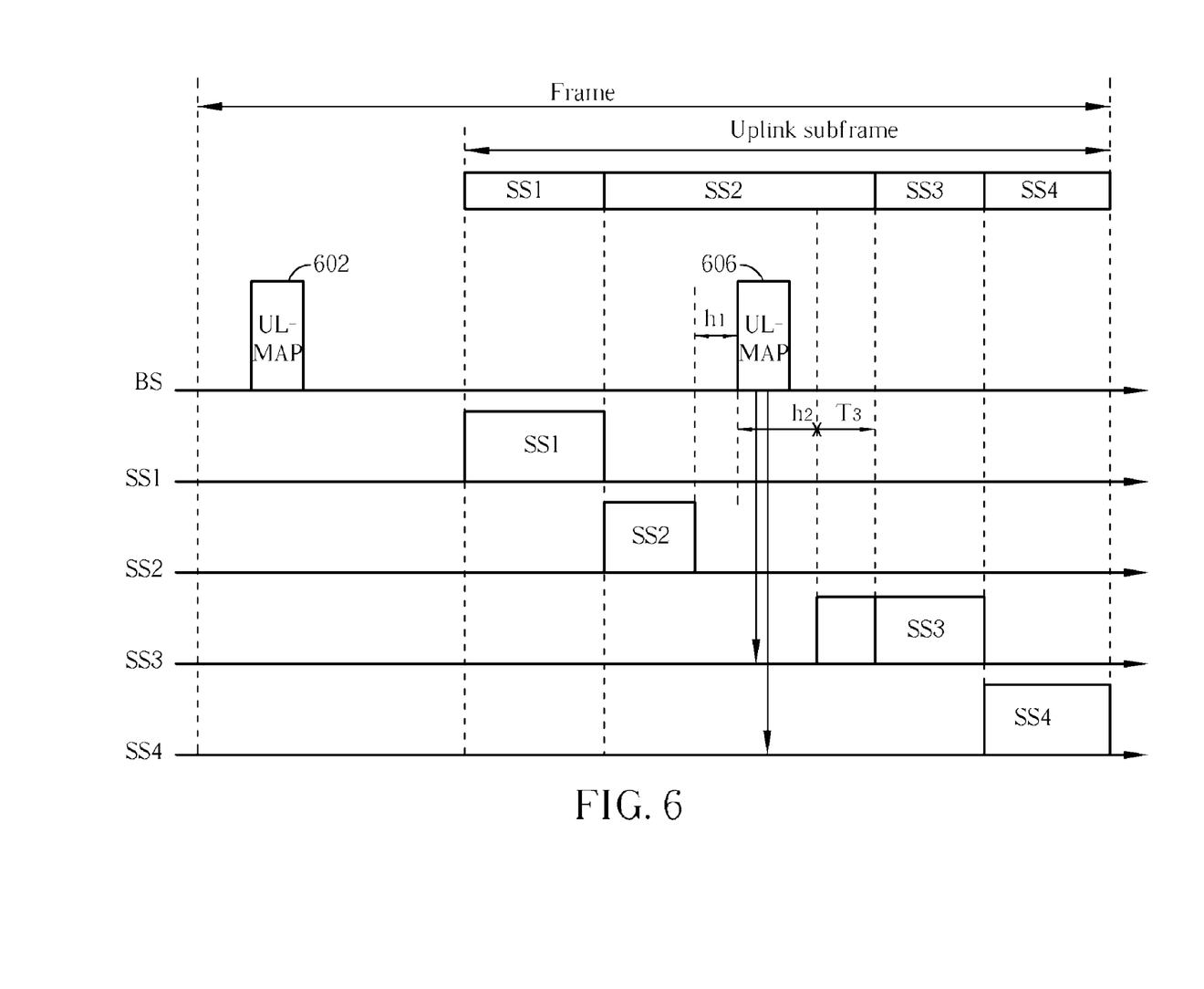
FIG. 6 is a timing diagram illustrating a bandwidth recovery method according to a second exemplary embodiment employed when an uplink channel is under a padding waste condition.

Please refer to FIG. 6. FIG. 6 is a timing diagram illustrating a bandwidth recovery method according to a second exemplary embodiment employed when the uplink channel is under a padding waste condition. Suppose that the duration $x_2$ of the subscriber station SS2 is longer than the duration actually needed by the subscriber station SS2, and the subscriber station SS2 delivers no padding data after finishing its upload operation. As a result, at the remainder of the duration $x_2$ the uplink channel is at an idle state. As shown in FIG. 6, the base station BS first detects as mentioned above and then checks whether the remainder of the duration $x_2$ is longer than $h2+D+T_{BR}$. When the remaining duration is longer than $h2+D+T_{BR}$, the uplink scheduling message (UL-MAP) 606 is transmitted. The base station BS will adopt the bandwidth recovery method R2, i.e., follow the uplink scheduling content 604 within the uplink scheduling message (UL-MAP) 602 to thereby assign the remaining duration not used by the subscriber station SS2 to the immediately following subscriber station SS3 only. Suppose that the remaining duration is represented as $T_3$ shown in FIG. 6; within the new uplink scheduling message (UL-MAP) 606, a new duration $x_3^*$ of the subscriber station SS3 is set by x3+T3 (i.e., $x_3^*=x_3+T_3$) and a new duration $x_4^*$ of the subscriber station SS4 is still $x_4$ (i.e., $x_4^*=x_4$).

Please note that the disclosed bandwidth recovery methods from the aforementioned embodiments as illustrated in FIG. 1-FIG. 6 are for illustrative purposes only, and are not meant to be limitations of the present invention. Furthermore, even though the aforementioned embodiments are applied to communication systems complying with the IEEE 802.16 standard, the bandwidth recovery methods provided by the present invention are also capable of being applied to any communication system utilizing a Time Division Multiplexing (TDM) scheme. These all fall in the scope of the present invention.

An advantage of the present invention is that through a scheme of re-transmitting an uplink scheduling message (such as UL-MAP defined in the IEEE 802.16 standard), the originally idle uplink channel can be used more efficiently to solve the bandwidth waste problem in the prior art.

Those skilled in the art will readily observe that numerous modifications and alterations of the device and method may be made while retaining the teachings of the invention.

What is claimed is:

1. A bandwidth recovery method for a communication system, comprising:
   transmitting a first uplink scheduling message to at least a first communication node and a second communication node within a plurality of communication nodes of the communication system, wherein the first communication node and the second communication node share a communication channel, and the first uplink scheduling message indicates uplink durations within the communication channel that are assigned to the first communication node and the second communication node and a first transmission start time, respectively;
   detecting if the communication channel is in an idle state after the first transmission start time, wherein the first transmission start time is a timing when the first communication node is allowed to start transmitting data; and
   transmitting a second uplink scheduling message to the plurality of the communication nodes when the communication channel is found staying in the idle state after the first transmission start time, wherein the second uplink scheduling message indicates an uplink duration within the communication channel that is assigned to at least one of the first communication node and the second communication node within the communication channel;
   wherein the first uplink scheduling message defines a node transmission start time of each communication node based on the first transmission start time and uplink durations, and the node transmission start time of the second communication node remains unchanged according to a scheduling setting defined in the second uplink scheduling message, and at least one of the communication nodes transmits data according to the first uplink scheduling message after the second uplink scheduling message has been transmitted to all of the plurality of the communication nodes;
   wherein the scheduling setting of the second uplink scheduling message is different from the scheduling setting of the first uplink scheduling message, and the second uplink scheduling message maintains an uplink duration of at least the second communication node that is originally defined in the scheduling setting of the first uplink scheduling message;
   wherein the second uplink scheduling message further re-arranges an uplink duration of the first communication node that is originally defined in the scheduling setting of the first uplink scheduling message, thereby distributing an additional duration, which is within a remaining available duration of the uplink duration of the first communication node that is originally defined in the scheduling setting of the first uplink scheduling message, to the second communication node.

2. The bandwidth recovery method of claim 1, wherein the communication system is a time division multiplexing (TDM) system.

3. The bandwidth recovery method of claim 2, wherein the communication system complies with a Data Over Cable System Interface Specification (DOCSIS).

4. The bandwidth recovery method of claim 1, wherein the step of detecting if the communication channel is in an idle state after the first transmission start time comprises:
   detecting if the first communication node does not transmit data for a period exceeding a predetermined time after the first transmission start time, wherein the predetermined time is not shorter then a propagation time.

5. The bandwidth recovery method of claim 1, further comprising:
   when a specific uplink duration within the communication channel that is assigned to a communication node of the plurality of communication nodes is longer than an uplink duration actually needed by the communication node, the communication node transmitting no padding data after the communication node finishes transmitting data within the specific uplink duration.

6. The bandwidth recovery method of claim 1, further comprising:

determining whether a remaining uplink duration exceeds a threshold value before transmitting the second uplink scheduling message.

7. The bandwidth recovery method of claim 6, wherein the threshold value is not shorter than an operating time needed for transmitting an uplink scheduling message and a minimum data unit.

8. The bandwidth recovery method of claim 1, wherein a third transmission start time scheduled by the second uplink scheduling message is a transmission time of the second uplink scheduling message plus a specific period, the third transmission start time defines a timing when the second communication node is allowed to start transmitting data, and the specific period is not shorter than an operating time starting from the transmission time to the timing when the second communication node is allowed to start transmitting data.

* * * * *